Patented Dec. 31, 1940

2,226,672

UNITED STATES PATENT OFFICE 2,226,672

INSECTICIDE

Lloyd E. Smith, Washington, D. C.; dedicated to the free use of the People in the territory of the United States No Drawing. Application January 28, 1938, Serial No. 187,571

3 Claims. (Cl. 167—30)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

I hereby dedicate the invention herein described to the free use of the People in the territory of the United States to take effect on the granting of a patent to me.

My invention relates to improvements in materials for destroying or checking the growth or multiplication of living organisms, whether plant or animal, which are economically injurious to man.

An object of my invention is to provide a material for use as an insecticide.

Another object of my invention is to provide a material which is relatively non-toxic to man and warm blooded animals when taken by mouth, and which can be used in place of lead arsenate and other arsenicals for destroying insects, without leaving a harmful residue on fruits and vegetables.

I have found that organic compounds of the general formula

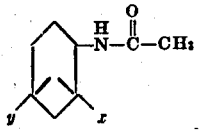

where $x$ is halogen and $y$ represents hydrogen, an alkyl, aryl, hydroaryl, nitro, amino or halogen group, are effective in killing many species of insects whether applied externally or internally; that these organic products may be sprayed or dusted upon delicate vegetation without injuring it; that these materials are even more toxic than lead arsenate and other commonly used insecticides and that they are relatively non-toxic to warm blooded animals.

Suitable products according to this invention are p-bromoacetanilide, p-chloroacetanilide, p-iodoacetanilide, etc.

The products formed by the above reaction may be reduced to an impalpable powder by grinding and applied to vegetation either dry as a dust or wet as a spray and the products being soluble in mineral and vegetable oils may be applied as a component of an oil emulsion spray. When applied as a spray in water it may be desirable to incorporate as an effective wetting agent, a material such as for example one of the sulfated high-molecular weight alcohols. These products may also be applied by dissolving the material in acetone, or other suitable solvent soluble in water, and then pouring the resulting solution into water, whereupon a fine colloidal precipitate is formed.

For example, tests with p-chloroacetanilide against various insects gave the following results:

In tests against the southern army worm when used as a dust at a concentration of 140 micrograms per square centimeter gave 100 percent kill.

When used in the same manner against the crossed-striped cabbage worm at a concentration of 140 micrograms per square centimeter the kill was 84 percent.

When used against Noropsis hieroglyphia at a concentration of 145 micrograms per square centimeter the kill was 98 percent.

Other compounds also showing great insecticidal action as covered by my invention are the m- and p-chloroacetanilides, the o-, m- and p-bromo and iodo-acetanilides, and derivatives thereof. It is to be understood that the above compound was used in describing entomological results merely as an example and that this invention is not to be restricted by such use.

Having thus described my invention what I claim for Letters Patent is:

1. An insecticide, containing as its essential active ingredient, p-chloroacetanilide.
2. An insecticide, containing as its essential active ingredient, p-bromoacetanilide.
3. An insecticide, containing as its essential active ingredient, p-iodoacetanilide.

LLOYD E. SMITH.